Figure 1:
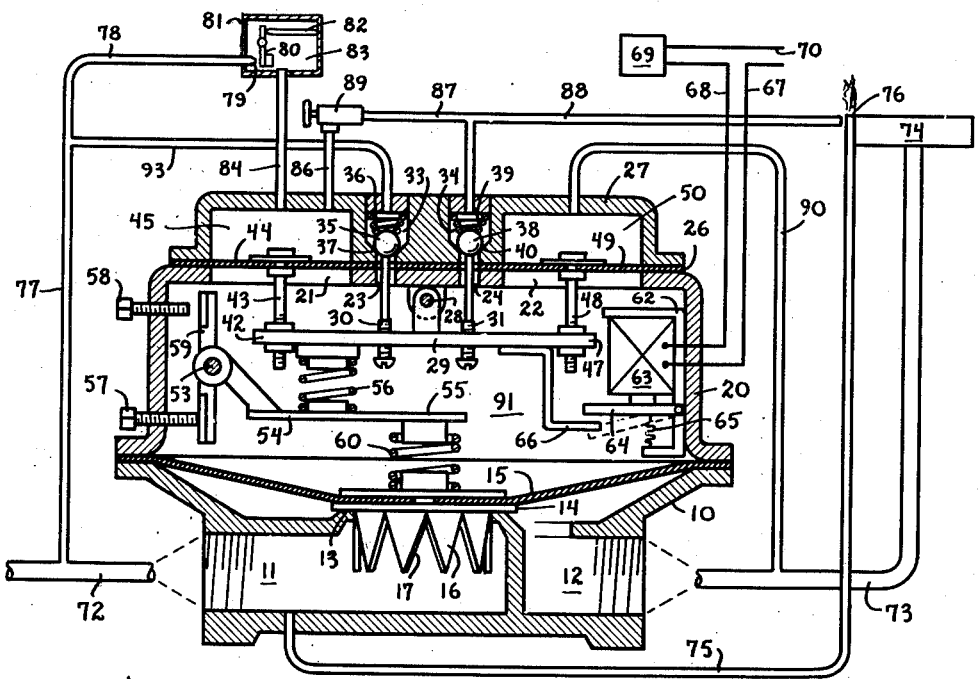

Nov. 14, 1944.   J. L. HARRIS   2,362,631
FLOW CONTROL VALVE
Filed March 28, 1941   2 Sheets-Sheet 1

INVENTOR
John L. Harris
BY
George H. Fisher
ATTORNEY

Patented Nov. 14, 1944

2,362,631

UNITED STATES PATENT OFFICE 2,362,631

FLOW CONTROL VALVE

John L. Harris, Milwaukee, Wis., assignor to Minneapolis-Honeywell Regulator Company, Minneapolis, Minn., a corporation of Delaware Application March 28, 1941, Serial No. 385,647

2 Claims. (Cl. 137—139)

The present invention relates broadly to a valve for controlling flow, and is more specifically directed to a valve which proportions the flow of a fluid in accordance with the demand.

In general there are two methods by which the flow of a fluid is proportioned by the control of a valve which utilize what is known as the "follow up" principle. In the case of a pressure actuated valve, a pilot valve is used for varying the pressure which actuates the main valve. In most cases some form of condition responsive device is provided for moving the pilot valve for varying the pressure and hence causing movement of the main valve. One method of flow control comprises a "follow up" from valve position; that is, a connection between the main valve and pilot valve causes the pilot valve to return to its neutral position upon movement of said main valve, thus arresting its movement. In this method of control there is a definite valve position for each value of the condition which causes operation of the pilot valve. One difficulty with this method of control is that when the valve is nearly closed a small valve movement has a very material effect upon the flow of fluid, but when the valve gets in the upper range of movement it has very little effect upon the flow. This method of control is not entirely satisfactory in many types of installations when the valve is more than about half open.

Another method of control is by following up from outlet pressure, or in other words, by maintaining a definite outlet pressure for every value of the condition. This method of control while being satisfactory when the valve is open a substantial amount is not entirely satisfactory when the valve is nearly closed for the reason that the flow from the valve usually varies as a square root function of the outlet pressure. Thus as the outlet pressure is decreased to a minimum, the flow does not decrease proportionately, a substantial flow being possible when the pressure is reduced the minimum at which the pressure responsive follow up control is capable of operating. In addition, when the valve is nearly closed, very small movements thereof have very great effect on the flow of fluid. Due to a slight change in pressure accompanying a large change in flow and a very small change in valve positions resulting in a large change in pressure, the pressure responsive follow up device must be extremely sensitive or erratic control will result.

The prime object of this invention is to combine the above two methods of control so that for all valve positions between a minimum and some intermediate position in the neighborhood of half open, the control will be followed up in accordance with valve position, and for all valve positions between said intermediate and wide open positions the control will be followed up in accordance with outlet pressure. By utilizing such a method a result will be accomplished in which the flow through the valve will be varied in approximate accordance with the value of the controlling condition.

In pursuance of the above object it is a further more specific object to provide for a mechanical follow up from valve position for all valve movements between a minimum and an intermediate position and to disable this follow up for all valve movements between said intermediate and full open position and to provide additionally for a follow up from outlet pressure which is always operative but which has little or no effect upon the valve when it moves between the minimum and intermediate positions.

A still further object is to render the mechanical follow up inoperative between the minimum position and closed position so that the valve, on opening, will quickly reach this position from closed position. This is so that a sufficient flow will be present for ignition purposes when the valve controls the flow of gas to a burner. This invention contemplates the adjustment of both the minimum and intermediate positions.

In some cases it is desired that the valve open fairly wide to afford the proper flow for ignition purposes and that thereafter it may throttle down to a much lower minimum flow. The present invention includes a device for performing such a function.

Figure 2:
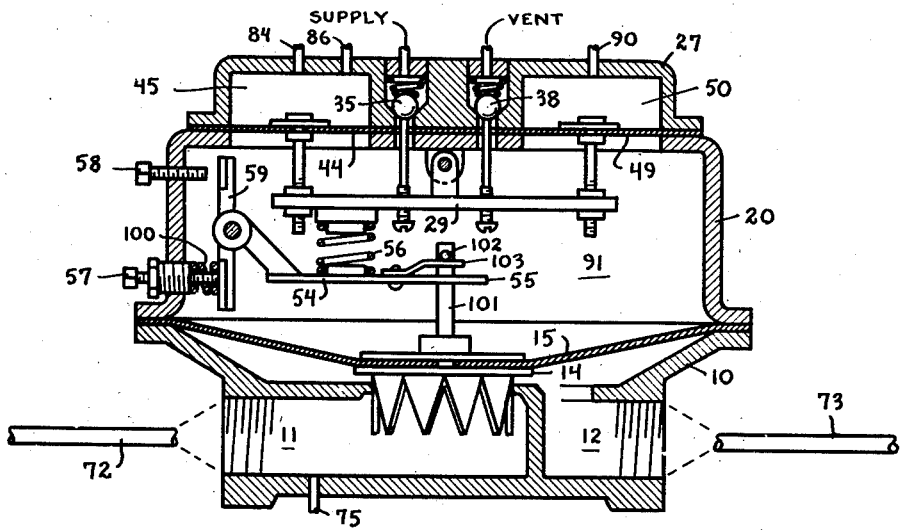
Figure 3:
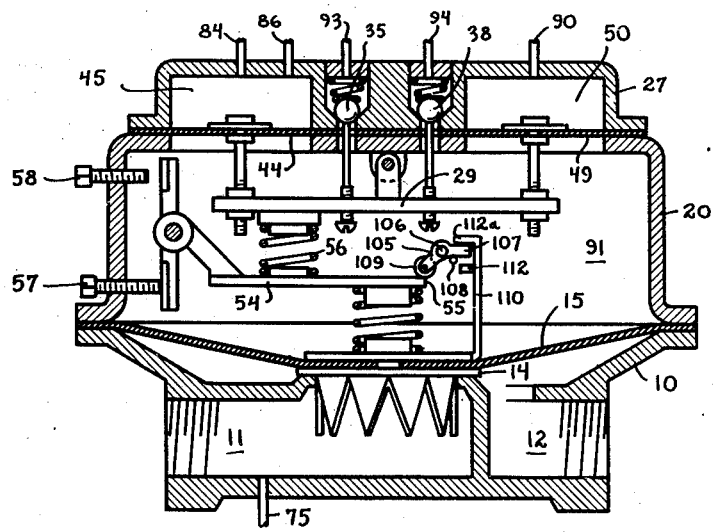

These and other objects will readily become apparent as the following specification is read in the light of the accompanying drawings, in which Figure 1 is a view of a pressure operated flow control valve embodying my invention, the valve casing being shown in section in order to more clearly illustrate some of the parts, Figure 2 is a view similar to Figure 1 showing a modification of the invention, and Figure 3 is a view showing a further modification of my invention.

Referring now to the drawings, the reference numeral 10 indicates a lower valve casing which includes an inlet chamber 11, outlet chamber 12 and a passage connecting the two chambers which is surrounded by a valve seat 13. A valve disc 14 is provided which is adapted to seat on the valve seat 13 and which is carried by means of a diaphragm 15 which extends across and seals the upper portion of the valve casing 10. The valve disc 14 is provided with a skirt 16 which has V-shaped openings 17 therein for properly proportioning the flow of fluid (in this case gas) through the casing 10.

The diaphragm 15 is clamped at its circumference and sealed to the casing 10 by means of a housing 20 which is secured thereto by any suitable fastening means, not shown. The diaphragm 15 is freely flexible so that when the pressures above and below the diaphragm are equalized the valve disc 14 will seat by its own weight. The top of the housing 20 is provided with two relatively large openings 21 and 22 and two smaller openings 23 and 24 located between the large openings. A second diaphragm indicated at 26 extends across all four of these openings and is clamped to the housing 20 by means of a top 27.

Pivoted to the upper portion of the housing 20, as shown at 28, is an actuating lever 29 which is provided with two adjustable stems 30 and 31 which extend upwardly through the openings 23 and 24 and through similar openings in the diaphragm 26 and into chambers 33 and 34 respectively formed in the top 27. A ball valve 35 is located in chamber 33 and is biased by means of spring 36 into engagement with the seat 37. Ball valve 38 is located in chamber 34 and is biased by means of spring 39 into engagement with the seat 40. When the two valves 35 and 38 engage their respective seats 37 and 40, the openings 23 and 24 through the top of the valve casing 20 are closed. The left hand end 42 of the actuating lever 29 is adjustably connected by means of the stem 43 to one portion 44 of the diaphragm 26 which seals the opening 21 through the top of the housing 20 and the chamber 45 formed in the top 27. The right hand end 47 of the actuating lever 29 is connected adjustably through the stem 48 with the portion 49 of the diaphragm 26 which seals the opening 22 and chamber 50 in the top 27. With the lever 29 in the position shown, both of the ball valves 35 and 38 are closed but the stems 30 and 31 are so adjusted that a slight rotation of the lever 29 in either direction will cause one or the other of the two valves to open.

Pivotally mounted in the housing 20, as shown at 53, is a follow up lever 54 having a first arm 55 which is connected to the lever 29 by means of the coil spring 56. A pair of adjustable stop screws 57 and 58 extend through the side of the housing 20 to cooperate with another arm 59 on the follow up lever 54 so as to limit its rotation in each direction. As shown, the arm 59 is in engagement with the stop screw 57, which therefore limits the downward movement of arm 55. The valve disc 14 carries a coil spring 60 which is shown as separated slightly from the arm 55 of the follow up lever 54 in order to provide for a lost motion. The spring 60 is stronger than the spring 56 for a purpose which will be described later.

Also mounted inside of the housing 20 is a bracket 62 which carries an electromagnet 63 which, when energized, attracts an armature 64 which is biased in a downward direction by means of the biasing spring 65. When the electromagnet is deenergized the spring 65 pulls the armature 64 down, at which time it engages an extension 66 on the actuating lever 29 which causes this lever to rotate in a direction to open the ball valve 35. One side of the electromagnet is connected by means of conductor 67 to a source of power and by conductor 68 to an automatic control switch 69. This switch may be any type of limit control or, if desired, may be operated by a room thermostat. A conductor 70 connects this switch with the other side of the source of power.

This control valve will be described as controlling the flow of gas to a burner although it will be appreciated that it will have many other useful applications. For the purpose of this description, however, the inlet chamber 11 is shown as connected to a gas supply pipe 72 and the outlet chamber 12 is shown as connected to a pipe 73 which conducts gas to a burner 74. Another pipe 75 connects the pilot burner 76 directly with the inlet chamber 11.

It is desired that the pressure in chamber 45 be varied thermostatically in order to actuate the two pilot valves 35 and 38. To this end, the pipe 77 is connected to the gas supply pipe 72 and conducts gas to the pipe 78 which terminates in a nozzle 79. A flapper valve 80 is adapted to control the bleeding of gas from the nozzle 79. For the purposes of illustration, the flapper valve 80 has been shown as being under the control of an expansible hard rubber tube 81, in which the relatively non-expansible rod 82 moves the flapper away from the nozzle 79 on a decrease in temperature in order to admit gas into the chamber 83 which is connected to chamber 45 by means of a pipe 84. Gas is constantly bled from the chamber 45 by means of the pipe 86 and pipes 87 and 88 which conduct the gas to the pilot burner where it is consumed. An adjustable restriction 89 is located between the two pipes 86 and 87 and this restriction is so adjusted as to have a greater retarding effect upon the flow of gas than does the nozzle 79, so that when the flapper valve 80 is in its wide open position gas will be delivered to the chamber 45 at a much greater rate than it can escape, with the result that this pressure can reach a value which approximates the pressure of the inlet gas in the pipe 72. When the flapper valve 80 is closed against the nozzle 79, the pressure will be completely vented in the chamber 45. For all intermediate positions of the flapper valve 80 there will be a corresponding pressure established in chamber 45, so that the thermostatic device 81 is capable of maintaining a pressure in chamber 45 which bears a direct relationship to the temperature of the region in which the device 81 is located.

The chamber 50 is directly connected by means of the pipe 90 to the pipe 73 at the outlet side of the valve and therefore the diaphragm 49 is always subject to outlet pressure.

The diaphragm 15 actuates the valve 14 as a result of changes of pressure in the diaphragm chamber 91. This pressure is changed through the actuation of the two ball valves 35 and 38. The valve 35 is the inlet or supply valve and is connected by means of pipes 93 and 77 directly with the gas supply pipe 72. The waste valve 38 is connected by means of pipe 94 with pipe 88 which bleeds gas to the pilot burner 77. Obviously, therefore, when the valve 35 is opened, the pressure in the diaphragm chamber 91 increases, when the valve 38 is open the pressure in this chamber decreases, and when the actuating lever 29 is in neutral position both valves are closed and the pressure remains constant.

*Operation*

With the parts in the position shown in

Figure 1 of the drawings, the limit control switch 69 is closed with the result that the electromagnet 63 is energized, its armature 64 being drawn up in which position it has no effect on the actuating lever 29. The main valve 14 is seated, which means that the control thermostat is satisfied and the pressures in chambers 45 and 50 are substantially atmospheric. Inasmuch as the valve 15 is seated, the pressure within the diaphragm chamber 91 must have been raised to substantially that of the inlet 11. This pressure is therefore holding the valve firmly on its seat.

A decrease in temperature at the thermostat 81 will cause it to contract to move the flapper valve 80 away from the nozzle 79 which will increase the pressure in the chamber 45 and rotate the lever 29 slightly to open the waste valve 38. This lowers the pressure in the diaphragm chamber 91, and when it has been lowered sufficiently it will permit the pressure beneath the valve 14 to force that valve off of its seat. There will be no opposition to the opening movement of the valve 14 until the coil spring 60 engages the arm 55 of the follow up lever 54 at which point it will cause this lever to compress the spring 56 to oppose the original movement of the diaphragm 44 and return the lever 29 to its neutral position. This will reclose the waste valve 38 and prevent a further change in pressure, and the valve 14 will come to rest in this position. This is the minimum open position of the valve and is determined by the lowermost position of the follow up lever 54 which in turn is determined by the position of the adjustable stop screw 57. The position is so selected that a suitable minimum flow of gas will be available at the burner 74 in order to provide for proper ignition.

A further decrease in temperature at the thermostat 81 will result in a further increase in pressure in the chamber 45 which will again open the waste valve 38 and reduce the pressure in the diaphragm chamber 91. This will result in a further opening of the valve 14, and due to the fact that the spring 60 is stronger than the spring 56 the spring 56 will be compressed and additionally load the lever 29 returning it to neutral position and reclosing the waste valve 38. Although the diaphragm 49 is directly connected to outlet pressure this pressure is so low at this time as to have no appreciable effect upon this diaphragm. Therefore with the valve 14 moving near its closed position, the follow up action on the lever 29 is derived almost entirely from the valve 14 which, through spring 60 and follow up lever 54, variably compresses the spring 56 which balances the pressure in chamber 45 and acts to return lever 29 to neutral position. At this time, therefore, the device functions to produce a position of the valve 14 which depends upon the temperature at the thermostat 81. A further decrease in temperature at the thermostat 81 will cause a further opening of the main valve 14 and the further rotation of the follow up lever 54. As the valve 14 continues to open, the outlet pressure continues to increase and eventually arrives at a value where it materially assists the follow up lever 54 in returning the lever 29 to neutral position.

After the temperature at the thermostat 81 has decreased to a predetermined value, the valve 14 will reach such a position that the follow up lever 54 has engaged the adjustable stop screw 58. Thereafter a further opening of the valve 14 cannot further compress the spring 56 and therefore any follow up action on the lever 29 must take place entirely as a result of the increase in outlet gas pressure. At this time, however, the valve is opened to such an extent that the outlet pressure is appreciable and a satisfactory follow up action results. Therefore, after the follow up lever 54 has engaged stop 58, the device maintains an outlet pressure which is dependent upon the pressure in the chamber 45 and hence the temperature at the thermostat 81.

It will therefore be seen that after the valve has opened to its minimum flow position, a mechanical follow up action takes place between the valve and the actuating lever 29 until the outlet pressure becomes sufficiently great to aid in the follow up. At this time the device follows up as a result of the combination of the mechanical follow up action and the follow up by outlet pressure. Then when the valve reaches a predetermined intermediate position, the follow up lever 54 is rendered inoperative by its engagement at the stop 58 and the follow up action then occurs from outlet pressure only.

If at any time the limit control 69 should open the circuit to the electromagnet 63, the armature 64 will be released and will rotate the lever 29 so as to close the waste valve 38 and open the supply valve 35 which of course results in the closure of the main valve 14.

It will be noted that when the valve 14 is operating between its minimum position and intermediate position, the spring 60 overpowers the spring 56 and causes its compression. After the follow up lever 54 engages the stop 58 the valve 14 compresses the spring 60 so that it can operate from its intermediate position to its full open position. It will be noted that the two stops 57 and 58 are adjustable so that the minimum open position of the valve can be varied and so that the intermediate position at which the follow up changes over from the mechanical follow up to the follow up from outlet pressure may be adjusted.

Figure 2 discloses a modification of the device of Figure 1, the main difference being in the connection between the follow up lever 54 and the main valve 14. In view of the similarity between the two devices, the same reference numerals will be used in Figure 2 where the parts remain substantially the same.

It will be noted that in Figure 1 the follow up lever 54 is biased downwardly by the spring 56 and there is a one-way connection with the valve 14 by which it can move this lever upwardly. In Figure 2 the biasing spring 100 engages the arm 59 on the follow up lever 54 and overpowers the spring 56 to bias this lever upwardly. The valve 14 is provided with an upwardly extending stem 101 which has a cross pin 102. This cross pin is adapted to engage a strain release connection in the form of a leaf spring 103 carried by arm 55 of the follow up lever 54. The lever 54 is therefore biased upwardly and the one-way connection afforded by the cross pin 102 permits the valve 14 under the influence of the diaphragm 15 to pull this lever downwardly.

The two adjustable stop screws 57 and 58 cooperate with the follow up lever 54 in the same manner as shown in Figure 1. The valve 14 is illustrated in its minimum open position in Figure 2. If the thermostat 81 continues to expand, it will further decrease the pressure in the chamber 45 resulting in the opening of the supply valve

35. This will act to increase the pressure in the diaphragm chamber 91 with the result that the valve 14 will move to closed position. It is clear that this movement will be uninterrupted due to the fact that the follow up lever 54 will be incapable of moving downwardly to rebalance the actuating lever 29. Therefore the supply valve 35 will remain in open position until it is reclosed by a change in pressure in the chamber 45. Closure of the valve 14 is permitted by means of the strain release connection 103 between it and the follow up lever 54.

When the temperature at the thermostat 81 decreases it will increase the pressure in the chamber 45 until this pressure is sufficient to cause the diaphragm 44 to close the supply valve 35 and open the waste valve 38. This will permit the valve 14 to move uninterruptedly to its minimum open position at which time the strain release afforded by the leaf spring 103 will be released and the follow up lever 54 will compress spring 56 and return the lever 29 to its neutral position. The device will thereafter function in exactly the same manner as the device disclosed in Figure 1, and further description of its operation is therefore deemed unnecessary.

A further modification of this invention is disclosed in Figure 3 wherein a special mechanism has been provided for the purpose of rendering the follow up lever 54 inoperative until the valve has moved from its closed position to a predetermined intermediate position although this lever is thereafter operative to act as a follow up device as the valve is throttled towards its minimum open position.

More specifically, the follow up lever 54 cooperates with a latch 105 which is pivotally mounted on the housing 20 as shown at 106. A biasing means such as a spring (not shown) biases this latch to the position shown in which the arm 107 engages stop 108 at which time the roller 109 is in engagement with the end of arm 55 to prevent rotation of the follow up lever 54 in a counter-clockwise direction.

The valve 14 in this instance carries an upstanding bracket 110 which is provided with an extension 112. The purpose of this extension is to engage the arm 107 when the valve has been opened to an intermediate or full open position and trip the latch 105 thereby releasing the follow up lever 54 for movement and rendering it operative as a follow up device. The lever 54 is thereafter operative until the valve has reached a substantially closed position, at which time the latch is returned to the position shown in Figure 3 by either its biasing means, extension 112a or both and prevents further operation of the lever 54 until the valve again reaches its intermediate position.

Considering the operation of this device in detail, if the temperature at the thermostat 81 decreases it will increase the pressure in the chamber 45 so as to open the waste valve 38. This will decrease the pressure in the diaphragm chamber 91 and the valve 14 will start to open. The latch 105 prevents any follow up action of the lever 54, and as a result, the waste valve 38 remains open and the pressure in the diaphragm chamber 91 continues to decrease. The valve 14 therefore continues to open until the extension 112 engages the arm 107 and trips latch 105. The follow up lever 54 is thereupon released. In all probability at this time the valve 14 is wider open than would normally be required by the temperature at the thermostat 81. If this is the case, the follow up means 54 will respond to the valve position in such a manner as to close the waste valve 38 and open the supply valve 35. This will result in an increase in pressure in the diaphragm chamber 91 and a movement of the valve 14 toward closed position. The lever 54 will then perform its follow up action camming the latch 105 out of the way and will eventually expand the spring 56 sufficiently to rebalance the pressure on the diaphragm 44 and the supply valve will close, at which time the position of the valve 14 will correspond to the temperature at the thermostat 81. This device will thereafter function in the same manner as the device of Figure 1 until the pressure in the diaphragm chamber 91 has reached a value sufficient to close the valve 14. When the valve reaches closed position, the latch 105 will again assume the position shown in the drawings, and again when the waste valve 38 has been opened to reduce the pressure in the diaphragm chamber 91 the follow up lever 54 will be inoperative until the valve 14 reaches its intermediate position.

In this case the adjustable stop screw 57 can again be utilized to provide for the minimum open position from which the valve will close uninterruptedly. This screw has no effect upon the intermediate position however, this being determined by the latch 105 and extension 112. The operation of this modification is otherwise the same as that disclosed in Figure 1 and a further description thereof is not deemed necessary.

It will be seen therefore that I have designed an automatic control valve of the pressure responsive type in which the control is followed up by a combination of valve position and outlet pressure in such a manner that the flow of fluid through the valve can be made to more nearly equal the demand than it could by following up from either valve position or outlet pressure alone.

It will be understood that although this invention has been described and illustrated as controlling the flow of gas to a burner, the disclosure is for the purpose of illustration only and the invention is not so limited. Reference should be had to the appended claims for determining the actual limits of this invention.

I claim as my invention:

1. A flow control system comprising in combination, a main valve for controlling flow, a pressure responsive device positioning said valve, pilot valve means controlling the pressure in said pressure responsive device and hence the position of said main valve, a movable member for actuating said pilot valve means, a first actuating means for said movable member comprising a condition responsive device for moving said member to vary the position of said main valve, a second actuating means for said movable member actuated by said main valve, an adjustable stop for limiting the effect of one of said actuating means, and electromagnetic means effective upon deenergization thereof to cause said pressure responsive device to effect closure of said main valve independently of said condition responsive device.

2. A flow control system comprising in combination, a main valve controlling the flow of fluid, a pressure responsive device positioning said valve, pilot valve means for alternately supplying and exhausting pressure fluid from said pressure responsive device, said pilot valve means having a neutral position in which fluid pressure is neither supplied to nor exhausted from said pressure responsive device, first actuating means for said pilot valve means including a condition responsive device and operative to position said valve means in a manner to vary the pressure in said pressure responsive device and hence vary the position of said main valve, second actuating means for said pilot valve means operated by said main valve and tending to return said pilot valve means to neutral position, said second actuating means being in the form of a mechanical connection between said pressure responsive device and said pilot valve means, means rendering one of said pilot valve actuating means inoperative during a portion of the movement of said main valve, an electromagnet, a second condition responsive device controlling the energization of said electromagnet, and means operative upon deenergization of said electromagnet to cause said pressure responsive device to close said valve, regardless of the valve position.

JOHN L. HARRIS.